(12) United States Patent
Bodas et al.

(10) Patent No.: US 7,966,506 B2
(45) Date of Patent: Jun. 21, 2011

(54) SAVING POWER IN A COMPUTER SYSTEM

(75) Inventors: Devadatta V Bodas, Federal Way, WA (US); Justin Song, Beijing (CN)

(73) Assignee: Intel Corporation, Santa Clara, CA (US)

( * ) Notice: Subject to any disclaimer, the term of this patent is extended or adjusted under 35 U.S.C. 154(b) by 751 days.

(21) Appl. No.: 11/955,326

(22) Filed: Dec. 12, 2007

(65) Prior Publication Data

US 2009/0158067 A1  Jun. 18, 2009

(51) Int. Cl.
G06F 1/32 (2006.01)

(52) U.S. Cl. .................. 713/323; 713/322; 713/324

(58) Field of Classification Search .............. 713/320, 713/322, 323, 324
See application file for complete search history.

(56) References Cited

U.S. PATENT DOCUMENTS

| | | | | |
|---|---|---|---|---|
| 6,000,035 | A * | 12/1999 | Matsushima et al. | 713/320 |
| 6,193,422 | B1 * | 2/2001 | Belt et al. | 713/320 |
| 6,308,279 | B1 * | 10/2001 | Toll et al. | 713/323 |
| 6,988,214 | B1 * | 1/2006 | Verdun | 713/320 |

* cited by examiner

*Primary Examiner* — Thuan N Du

(74) *Attorney, Agent, or Firm* — Blakely, Sokoloff, Taylor & Zafman LLP

(57) ABSTRACT

A power management unit (PMU) may promote a processing core from a working state to a first non-working power saving state after receiving a signal from an automatic core C-state promotion (ACCP) unit. An OS component may detect the idling of the processing core and may initiate the ACCP. The ACCP may initiate the PMU to promote the processing core to a first non-working power saving state. The ACCP may track the residency time of the processing core in the first non-working power saving state and may initiate the PMU to promote the processing core to a next non-working power saving state if residency time of the processing core in the first non-working power saving state exceeds a first value. The ACCP may initiate the PMU to demote the processing core back to the working state if a break event occurs during the residency time.

20 Claims, 4 Drawing Sheets

SAVING POWER IN A COMPUTER SYSTEM

BACKGROUND

Power management in a computer system may be controlled by placing components of the system in various power states to achieve a desired target power consumption range. In some cases, it may be desirable to reduce power in a computer system of component thereof as much as possible while minimizing the delay with which the computer or component can handle workloads. In some prior art, a component or system can be placed in a low-power state, but then may need to return to a higher power state relatively soon thereafter to perform a task. If the component or system is placed in too low of power state, it may not be able to return from the power state to service a task within a desired amount of time. However, if the component is not placed in the low power state, it may consume unnecessary power, since it's difficult to know ahead of time when the component or system will need to return from the low power state.

As a result, some prior art power management techniques may either consume unnecessary power by not placing components or a system in a low power state, when appropriate to do so. Conversely, some prior art power management techniques may result in low component or system performance by not returning from a low power state fast enough to perform a task within a desired amount of time.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes embodiments of a technique for managing power consumption in a computer system or computer system component such as a microprocessor. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, and digital signals). Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Figure 1:
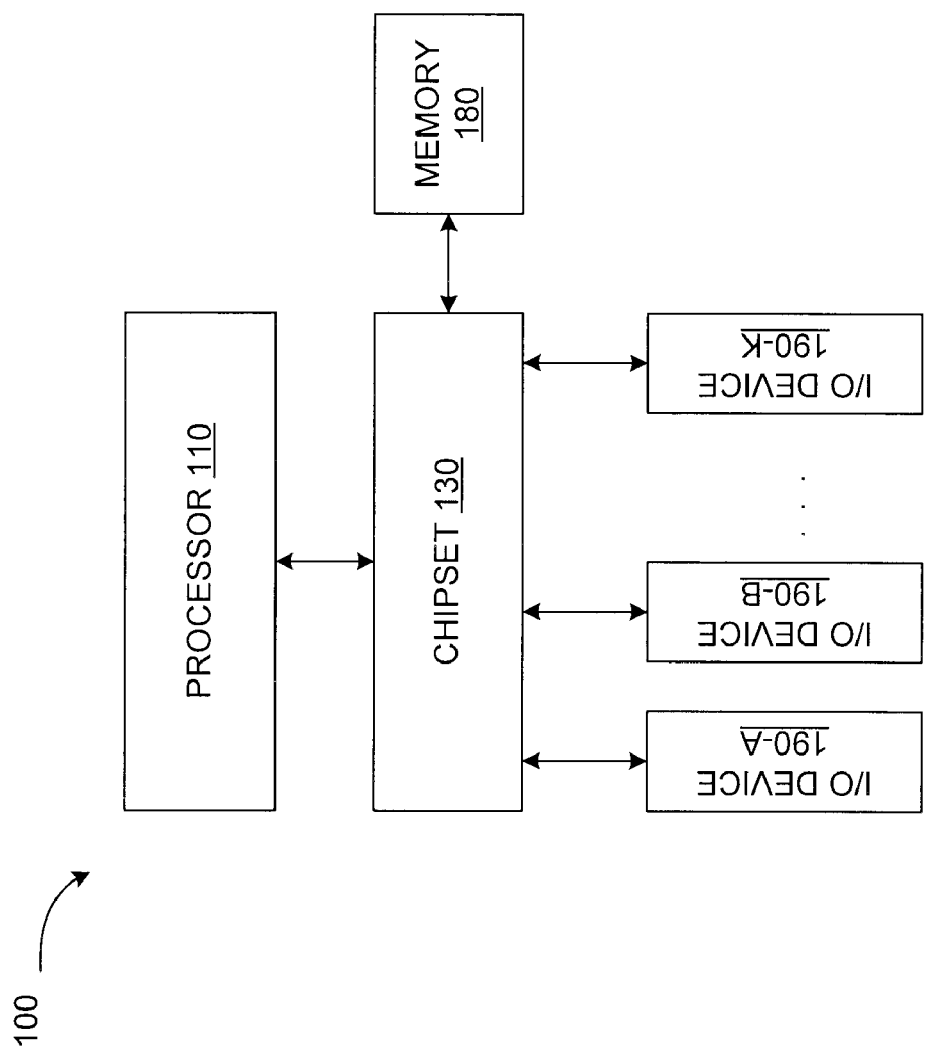
FIG. 1 illustrates a computer system, including a power management technique according to one embodiment.

A computing device 100, which may support power saving features in accordance with one embodiment is illustrated in FIG. 1. In one embodiment, the computing device 100 may comprise a processor 110, a chipset 130, a memory 180, and I/O devices 190-A to 190-K.

The chipset 130 may comprise one or more integrated circuits or chips that operatively couple the processor 110, the memory 180, and the I/O devices 190. In one embodiment, the chipset 130 may comprise controller hubs such as a memory controller hub and an I/O controller hub to, respectively, couple with the memory 180 and the I/O devices 190. The chipset 130 may receive transactions generated by the I/O devices 190 on links such as the PCI Express links and may forward the transactions to the memory 180 or the processor 110. Also, the chipset 130 may generate and transmit transactions to the memory 180 and the I/O devices 190 on behalf of the processor 110.

The memory 180 may store data and/or software instructions and may comprise one or more different types of memory devices such as, for example, DRAM (Dynamic Random Access Memory) devices, SDRAM (Synchronous DRAM) devices, DDR (Double Data Rate) SDRAM devices, or other volatile and/or non-volatile memory devices used in a system such as the computing system 100.

The processor 110 may manage various resources and processes within the processing system 100 and may execute software instructions as well. The processor 110 may interface with the chipset 130 to transfer data to the memory 180 and the I/O devices 190. In one embodiment, the processor 110 may support power saving states such as the C1, C2, C3, C4, C5, C6, C7, C8, C9 and such other C states. In one embodiment, the processor 110 may support promotion of the processing core from a higher power consuming non-working state to a lower power consuming non-working state while the processing core is idle. Such an approach may improve the power saving opportunity.

Figure 2:
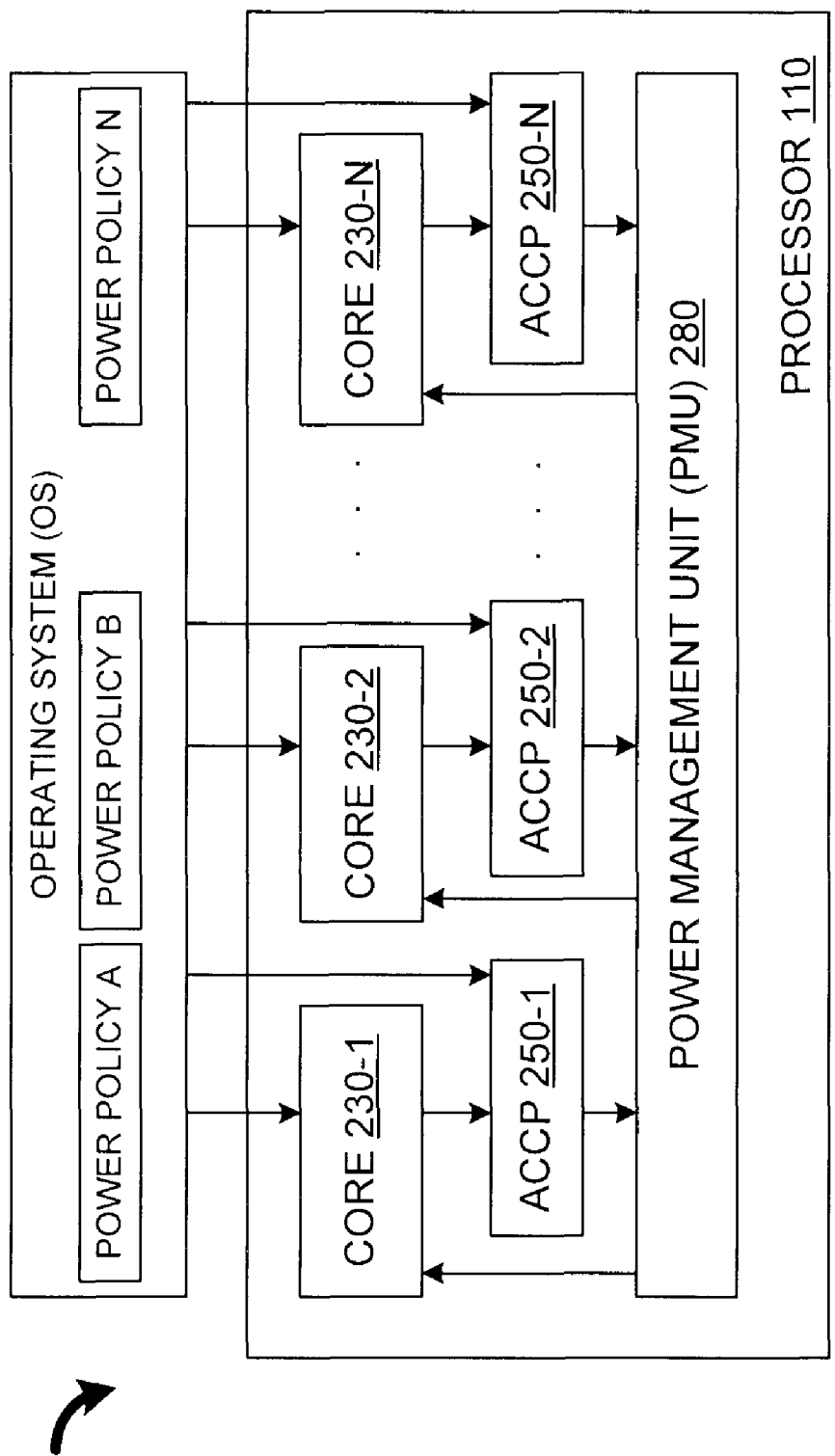
FIG. 2 illustrates a processor in which power management technique according to one embodiment may be used.

A processor 110 in which power saving feature is supported in accordance to one embodiment is illustrated in FIG. 2. In one embodiment, the processor 110 may comprise a plurality of processing cores 230-1 to 230-N, automatic core C-state promotion (ACCP) units 250-1 to 250-N coupled to the processing cores 230-1 to 230-N, and a power management unit (PMU) 280. In one embodiment, the processing cores 230 may support a working state C0 and non-working power saving states such as the C1 to C9 states, or other states as defined by a power management specification, such as versions of Advanced Configuration and Power interface (ACPI) specification. In other embodiments, power management states may be described by other specifications or may not be a part of any industry specification.

An operating system (OS), supported by the processor 110, may manage the resources available on the processing cores 230 in one embodiment. For example, in one embodiment, an OS may track the utilization levels of the cores 230-1 to 230-N in the working state C0. An OS may also track the history of residency time of the processing cores 230-1 to 230-N in each non-working power saving states. In one embodiment, an OS may include routines such as "power policy blocks" A to N, which may provide policies based on which the processing cores 230 may be promoted from a higher power consuming non-working power saving state (e.g., C1) to other lower power consuming non-working power saving state (e.g., C3) or to a working state C0. The power policy blocks A to N may select the power states in which the cores 230 is to operate based on the utilization level of the processing cores 230 or the history of residency time in the non-working power saving state. Moving the processing cores 230 from one power state to other based on utilization levels may include large latencies associated with entering and exiting higher non-working power saving states. Such an approach may limit the power saving opportunities.

For illustration, an embodiment of a power saving approach is described only with reference to the processing core 230-1. However, the same approach may be applied for saving power in the other processing cores 230-2 to 230-N. Also, the power saving mechanism may be applied to the processing cores 230-1 to 230-N simultaneously. In one embodiment, an OS may detect occurrence of a state-changing parameter related to the processing core 230-1 and may generate a 'power-save' signal, which may be sent to the ACCP 250-1. In one embodiment, the OS may detect a state-changing parameter such as the idling of the processing core 230-1 and generate the 'power-save' signal. In one embodiment, the ACCP 250-1 may be coupled to the processing core 230-1. In one embodiment, an OS may use a 'mwait' instruction to initiate the ACCP 250-1, which may cause entry of the processing core 230-1 from the working state C0 to a non-working power saving state C1. In other embodiments, the state-changing parameters may comprise prediction for idle duration of the processing core 230-1, an indication of latency tolerance, an indication of performance tolerance, a OS or user preference, a heuristic based upon history of past idle duration, a heuristic based upon history of past use of non-working states, or any other system power-performance parameter than can be tracked either by hardware or software.

In one embodiment, the ACCP 250-1, in response to receiving the 'power-save' signal, may send a first 'power state promote' signal to the PMU 280 that may cause promotion of the processing core 230-1 from the working state C0 to the non-working power saving state C1. After the processing core 230-1 enters C1 state, in one embodiment, the ACCP 250-1 may track the residency time (RT) of the processing core 230-1 in C1 state. In one embodiment, the ACCP 250-1 may compare the residency time of the processing core 230-1 in C1 state with a first value before generating a next 'power-state promote' signal.

In one embodiment, the first value may be function of the entry latency (EN_LAT) and exit latency (EX_LAT) of the processing core 230-1 to enter and exit the non-working power saving state C3. In other embodiments, the first value may be determined based on a value provided by the OS, or a value provided by a end-user, or a value indicating acceptable degradation in performance, or history of use of C states, or history of idle duration, or history of entry and exit latencies. In one embodiment, the entry and exit latencies may be established by hardware and may represent a-priori parameters based on the power management policies. In one embodiment, the first value may equal 2×[(EN_LAT of C3)+(EX_LAT of C3)].

In one embodiment, the ACCP 250-1 may generate a second 'power state promote' signal to the PMU 280, which may promote the processing core 230-1 to a next non-working power saving state C3. In one embodiment, the ACCP 250-1 may generate the second 'power state promote' signal if the residency time of the processing core 230-1 in C1 state exceeds the first value.

In one embodiment, the ACCP 250-1 may track the residency time of the processing core 230-1 in C3 state. In one embodiment, the ACCP 250-1 may compare the residency time of the processing core 230-1 in C3 state with a second value before generating a next 'power state promote' signal. In one embodiment, the ACCP 250-1 may send the 'power state promote' signal to the PMU 280 to promote the processing core 230-1 to a next non-working power saving state C6. In one embodiment, the ACCP 150-1 may generate the next 'power state promote' signal if the residency time of the processing core 230-1 in C3 state exceeds the second value. In one embodiment, the second value may be greater than the first value. In one embodiment, the second value may equal twice the sum of C6 state entry and exit latency. As a result, the processing core 230-1 may remain in C3 state for a longer duration compared to C1 state.

In one embodiment, the ACCP 250-1 may cause promotion of the processing core 230-1 from C6 state to C7 state if the residency time of the processing core 230-1 in C6 state exceeds a third value. In one embodiment, the third value may equal twice the sum of C7 state entry and exit latency.

In one embodiment, the power consumed by the processing core 230-1 in a next non-working power saving state (e.g., C6 state) may be lower compared to the power consumed by the processing core 230-1 in a previous non-working power saving state (e.g., C3 state). In one embodiment, the power consumed by the processing core 230-1 in C3 state may be lower compared to the power consumed by the processing core 230-1 in C1 state.

Also, while tracking the residency time, a break-event such as an interrupt signal, or read of a memory, or an I/O address, or any other physical signal to the processing core 230-1 may arrive and on the arrival of the break-event, the ACCP 250-1 may generate a 'power state demote' signal. In one embodiment, the 'power-state demote' signal may cause the PMU 280 to demote the core 230-1 to the working state C0 from a present non-working power saving state. For example, the processing core 230-1 may be demoted from C1, or C3, or C6, or C7 state to C0 state after ACCP 250-1 generates the 'power state demote' signal.

In one embodiment, the PMU 280 may promote the processing core 230-1 to a lower power consuming non-working power saving state after receiving the 'power state promote' signal. In one embodiment, the PMU 280 may promote the processing core 230-1 from C0 to C1 state after receiving the first 'power state promote' signal. In one embodiment, the PMU 280 may promote the processing core 230-1 from C1 to C3 state after receiving the second 'power state promote' signal. In one embodiment, the PMU 280 may promote the processing core 230-1 from C3 to C6 and from C6 to C7 after receiving subsequent 'power state promote' signal. In one embodiment, the PMU 280 may demote the processing core 230-1 to the working state C0 from a present non-working power saving C state such as C1-C9 states in response to receiving the 'power state demote' signal.

Such an approach may allow the processing core 230-1 to be promoted from a higher power consuming non-working power saving state to a lower power consuming non-working power saving state even while the processing core 230-1 is idling. As a result, the power saving in the processor 110 may improve.

Figure 3:
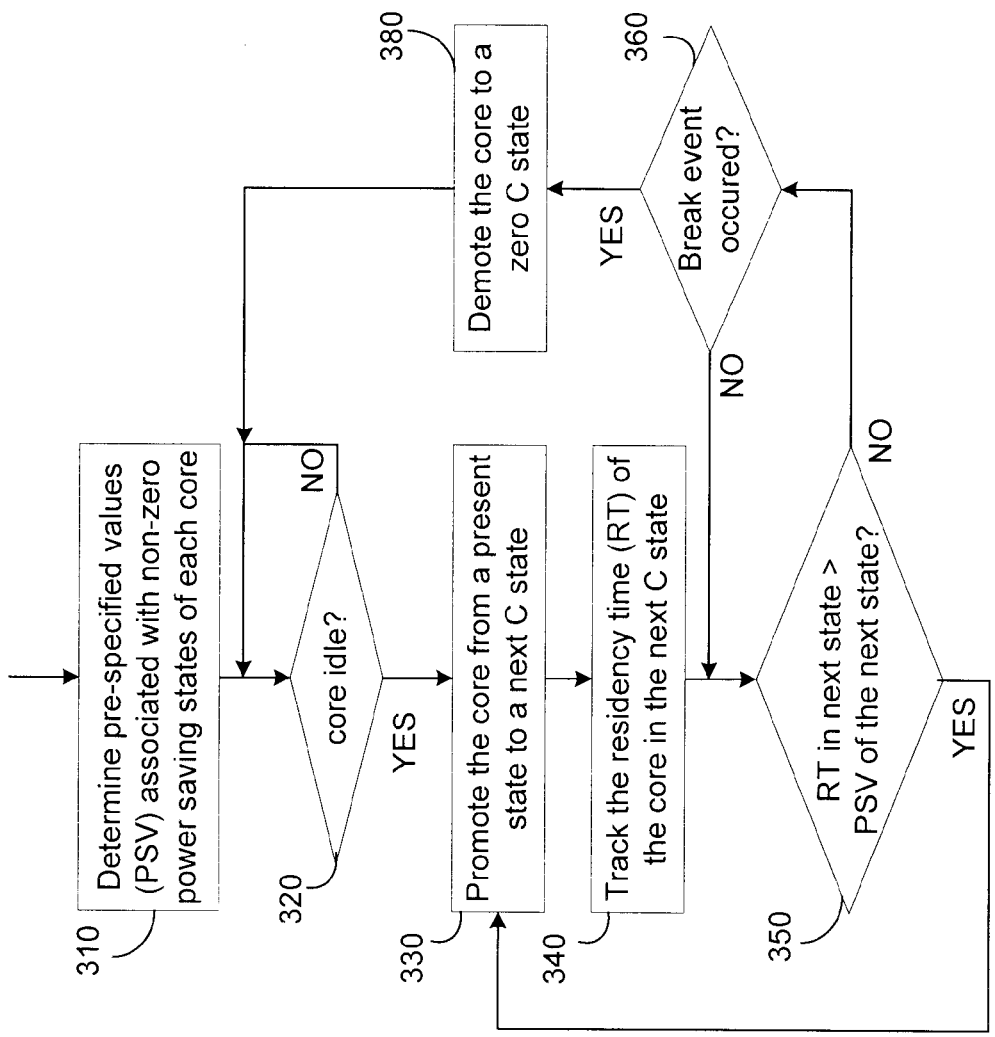
FIG. 3 is a flow diagram illustrating operations that may be performed by according to one embodiment.

FIG. 3 illustrates operations for performing a power management technique according to at least one embodiment of the invention.

In block 310, the PMU 280, or the ACCP 250-1, or the OS may determine a value associated with each non-working power saving state for each core. In one embodiment, the PMU 280 may determine a first, second, and third value associated with the non-working power saving states C3, C6, and C7 respectively. In one embodiment, the values may be stored in one or more registers within the processor 110.

In block 320, the operating system 205 may check if the processing core 230-1 is idle and control passes to block 330 if the processing core 230-1 is idle. In one embodiment, the operating system 205 may send the 'power-save' signal to the ACCP 250-1. In one embodiment, the ACCP 250-1 may generate and send the 'power state promote' signal to the PMU 280.

In block 330, the PMU 280 may promote the processing core 230-1 from C0 to C1 state. In one embodiment, the PMU 280 may promote the processing core 230-1 to C1 state in response to receiving the first 'power state promote' signal from the ACCP 250-1.

In block 340, the ACCP 250-1 may track the residency time of the processing core in the next C state C1. In one embodiment, the ACCP 250-1 may comprise a counter to track the residency time of the processing core 230-1 in the next C state C1.

In block 350, the ACCP 250-1 may compare the residency time of the processing core 230-1 in C1 state with the first value and control passes to block 330 if the residency time of the processing core 230-1 exceeds the first value and to block 360 otherwise.

In block 360, the PMU 280 may check whether a break-event has occurred and control passes to block 380 if the break-event occurs and to block 350 otherwise.

In block 380, the PMU 280 may demote the processing core 230-1 from the non-working power saving state C1, or C3, or C6, or C7 to the working state C0.

Figure 4:
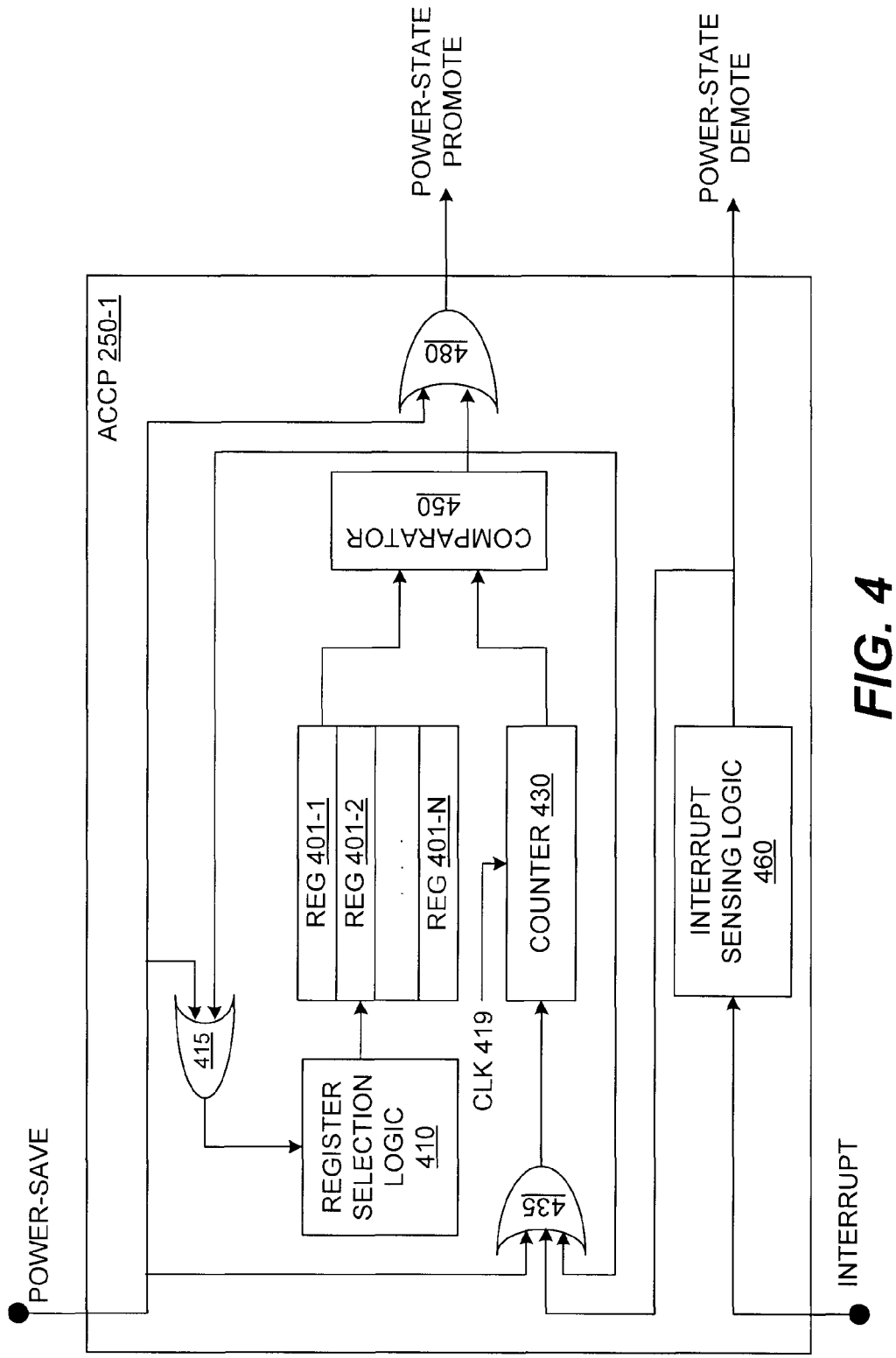
FIG. 4 illustrates logic that may used in accordance with at least one embodiment of the invention.

Logic that may used in conjunction with at least one embodiment of the invention is illustrated in FIG. 4. In one embodiment, the ACCP 250-1 may comprise a register selection logic 410, counter 430, an array of registers 401, a comparator 450, and an interrupt sensing logic 460, and logic gates 415, 435, and 480.

In one embodiment, the OS 205 may generate power save signal after sensing the idling of the processing core 230-1. The power-save signal may be provided as an input to the OR gates 415, 435, and 480. In one embodiment, the OR gate 480 may provide a power-state promote signal after receiving the power-save signal. Also, the OR gate 415 may provide a signal to the register selection logic 410, which may select the register REG 401-1. The OR gate 435 may provide a reset signal to the counter 430, which would start incrementing the count after receiving clock signal CLK 419.

In one embodiment, the comparator 450 may compare the contents of the register REG 401-1 and the counter 430 and may provide logic 1 if the content of the register REG 401-1 equals the value registered by the counter 430. In one embodiment, the OR gate 480 receiving the logic 1 may generate the power-state promote signal. In one embodiment, the output of the comparator 450 may also be provided as input to the OR gates 415 and 435. In one embodiment, the OR gate 415 may provide a signal to the register selection logic 410 after receiving the logic 1 from the comparator 450. In one embodiment, the OR gate 435 may provide a reset signal to the counter 430, which may start counting from zero value.

In one embodiment, the power-state promote signal generated in response to receiving the power-save signal may promote the processing core 230-1 from C0 to C1 state. Also, the power-save signal may cause the register selection logic 410 to select the REG 401-1 and reset the counter 430. While the processing core 230-1 enters the C1 state, the counter 430 may be reset to track the residency time of the processing core 230-1 in C1 state and the comparator 450 may compare the residency time with the first value stored in the REG 401-1. In one embodiment, the processing core 230-1 may be allowed to reside in the C1 state either until the residency time exceeds the first value or occurrence of the break-event. In one embodiment, if the residency time exceeds the first value, the processing core 230-1 is promoted to the next C state C3 and to C0 state on occurrence of the break-event.

In one embodiment, the initial power-state promote signal, register selection process, and resetting the counter 430 may be dependent on the power-save signal. Thereafter, the power-state promote signal may be generated based on the result of comparison of the contents of the REG 401-1 (first value) and the counter 430 (residency time of 230-1 in C1 state). In one embodiment, the counter 430 may track the residency time of the processing core 230-1 in each C-state and the processing core 230-1 may be allowed to remain in each C-state for a time period determined by the first, second, and third values.

However, the interrupt sensing logic 460 may generate the power-state promote signal after receiving an interrupt signal. In one embodiment, the interrupt sensing logic 460 may generate the power-state demote signal while the counter 430 tracks the residency time of the processing core 230-1. In one embodiment, the power-state demote signal may be used to reset the counter 430.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising:
   promoting a processor core from
      a first power saving state to a second power saving state in response to receiving a first power state promote signal,
      the second power saving state to a third power saving state in response to receiving a second power state promote signal, the third power saving state to a fourth power saving state in response to receiving a third power state promote signal,
wherein the first power-state promote signal, the second power state promotion signal, and the third power state promotion signal are generated in response to occurrence of a state changing parameter and the first, second, third, and the fourth power saving state represents C states of an automatic core C-state promotion (ACCP) policy, and
demoting the processor core from one of the first, second, third, or fourth power saving state to a working state if an event occurs during the time in which the processor core is in one of the first, second, third, or fourth power saving state, wherein the working state is a higher power consumption state than any one of the first, second, third, or fourth power saving state.

2. The method of claim 1, wherein the processor core is changed from the first power saving state to the second power saving state if the time in which the processor core in the first power saving state exceeds a first value, wherein the time in which the processor core is in the first power saving state exceeds a first value is the occurrence of the state-changing parameter.

3. The method of claim 2, wherein the first value is determined based on an entry latency and exit latency of the processor core to the first power saving state.

4. The method of claim 1, wherein the power saving in the second power saving state is higher than that of the first power saving state.

5. The method of claim 1 further comprises changing the processor core from the first power saving state to the second power saving state while the processing core is idle.

6. The method of claim 1 further comprises changing the processor core from the second power saving state to the third power saving state if the time in which the processor core in the second power saving state exceeds a second value.

7. The method of claim 6, wherein the second value is determined based on an entry latency and exit latency of the processor core to the second power saving state.

8. The method of claim 6 further comprises changing the processor core from one of the first, second, third, or fourth power saving state to the working state if the event occurs during the time in which the processor core is in one of the first, second, third, or fourth power saving state.

9. The method of claim 8, wherein the event is an interrupt signal to the processor core.

10. The method of claim 1 further comprises changing the processor core from a working state to the first power saving state if the processor core idles.

11. An apparatus comprising:
a first control logic to generate, a first signal if a first processor core remains in a first power saving state for a first amount of time, a second signal if the first processor core remains in a second power saving state for a second amount of time, a third signal if the first processor core remains in a third power saving state for a third amount of time, and
a power management unit coupled to the first control logic, wherein the power management unit is to promote the first processor core from
the first power saving state to the second power saving state in response to receiving the first signal,
the second power saving state to the third power saving state in response to receiving the second signal, and
the third power saving state to the fourth power saving state in response to receiving the third signal,
wherein the first, second, third, and the fourth power saving state represents C states of an automatic core C-state promotion (ACCP) policy,
wherein the power management unit is to demote the first processing core from one of the first, second, third, or fourth power saving state to a working state if an event occurs during the time in which the processor core is in one of the first, second, third, or fourth power saving state, wherein the working state is a higher power consumption state than any one of the first, second, third, or fourth power saving state.

12. The apparatus of claim 11, wherein the first control logic further comprises a counter to track the time in which the first processor core resides in the first power saving state.

13. The apparatus of claim 11, wherein the first control logic further comprises a interrupt sensing logic, wherein the interrupt sensing logic is to generate a second signal if an event occurs during the time in which the first processor core is in the first power saving state.

14. The apparatus of claim 13, wherein the power management unit is to change the first processor core from the first power saving state to working state after receiving an interrupt event, wherein the working state is a higher power consuming state than the first power saving state.

15. The apparatus of claim 11, wherein the first control logic further comprises a plurality of registers, wherein a first register of the plurality of registers is to store a first value,
wherein the first value is determined based on an entry latency and exit latency of the first processor core to enter and exit the first non-working power saving state.

16. The apparatus of claim 11, wherein the power saving in the second power saving state is higher than that of the first power saving state.

17. The apparatus of claim 11, wherein the power management unit is to promote the first processor core from the first power saving state to the second power saving state while the processor core is idle.

18. The apparatus of claim 11, wherein the first control logic further comprises a comparator to compare the time in which the first processor core resides in the first power saving state and the contents of the first register.

19. The apparatus of claim 11, wherein the first control logic is to generate a next signal if the time in which the first processor core residing in the second power saving state exceeds a second value.

20. The apparatus of claim 11 further comprises promotes the first processor core from a working state to a non-working power saving state after the first processor core idles.

* * * * *